(12) United States Patent
Yan et al.

(10) Patent No.: US 12,060,943 B2
(45) Date of Patent: Aug. 13, 2024

(54) SEALS AND METHODS OF MAKING AND USING THE SAME

(71) Applicant: SAINT-GOBAIN PERFORMANCE PLASTICS CORPORATION, Solon, OH (US)

(72) Inventors: Xiang Yan, Barrington, RI (US); Zamzam Golmohammadi, Riverside, RI (US)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 90 days.

(21) Appl. No.: 17/936,137

(22) Filed: Sep. 28, 2022

(65) Prior Publication Data

US 2023/0100083 A1    Mar. 30, 2023

Related U.S. Application Data

(60) Provisional application No. 63/261,815, filed on Sep. 29, 2021.

(51) Int. Cl.
    *F16J 15/3204*      (2016.01)

(52) U.S. Cl.
    CPC .................. *F16J 15/3204* (2013.01)

(58) Field of Classification Search
    CPC .... F16J 15/00; F16J 15/16; F16J 15/50; F16J 15/52; F16J 15/32; F16J 15/3204; F16J 15/3208; F16J 15/3212; F16J 15/3216; F16J 15/322; F16J 15/3224; F16J 15/3228; F16J 15/3232; F16J 15/3236
(Continued)

(56) References Cited

U.S. PATENT DOCUMENTS 4,709,725 A * 12/1987 Morrison .................. F16L 1/26
                                                137/614.04
5,163,692 A     11/1992 Schofield et al.
(Continued)

FOREIGN PATENT DOCUMENTS

EP           1767838 A1     3/2007
JP           2010520411 A     6/2010
(Continued)

OTHER PUBLICATIONS

Rotary Seal lip Design and Geometry, Annie Maloney, https://colonialseal.com/wp-content/uploads/2020/09/TA-Lip-Design-Geometry-8.2009.pdf (Variability in Lip Thickness).
(Continued)

*Primary Examiner* — Nathan Cumar
(74) *Attorney, Agent, or Firm* — Abel Schillinger, LLP; Ann Palma

(57) ABSTRACT

A seal including: annular jacket including a body including a heel, a first lip, and a second lip defining an annular recess, the first lip including an arcuate exterior portion, and having a thickness, $W_{FL}$, and a length $L_{FL}$; and an annular energizer disposed within the annular recess, adjacent to at least one of the first lip and the second lip, wherein the heel comprises a cutout portion, and wherein the ratio of $L_{FL}:W_{FL}$ is greater than 2.

20 Claims, 2 Drawing Sheets

(58) Field of Classification Search
USPC .......................................................... 277/549
See application file for complete search history.

(56) References Cited

U.S. PATENT DOCUMENTS

| | | | |
|---|---|---|---|
| 5,482,296 | A | 1/1996 | Peppiatt et al. |
| 6,419,236 | B1 | 7/2002 | Janian |
| 7,789,396 | B2 | 9/2010 | Takeno et al. |
| 9,182,041 | B2 | 11/2015 | Daub et al. |
| 10,550,942 | B2 | 2/2020 | Badrossamay et al. |
| 2016/0319936 | A1* | 11/2016 | Dubois ................ F16J 15/3212 |
| 2018/0266562 | A1 | 9/2018 | Balsells |
| 2019/0072182 | A1* | 3/2019 | Watanabe ............ F16J 15/3232 |
| 2020/0208743 | A1 | 7/2020 | Duong et al. |
| 2021/0254716 | A1* | 8/2021 | Burlot ................ F16J 15/3236 |

FOREIGN PATENT DOCUMENTS

| | | |
|---|---|---|
| JP | 2013032848 A | 2/2013 |
| KR | 101663531 B1 | 10/2016 |
| WO | 2023056277 A1 | 4/2023 |

OTHER PUBLICATIONS

International Search Report and Written Opinion for PCT Application No. PCT/US2022/077151, mailed Jan. 20, 2023, 11 pages.

\* cited by examiner

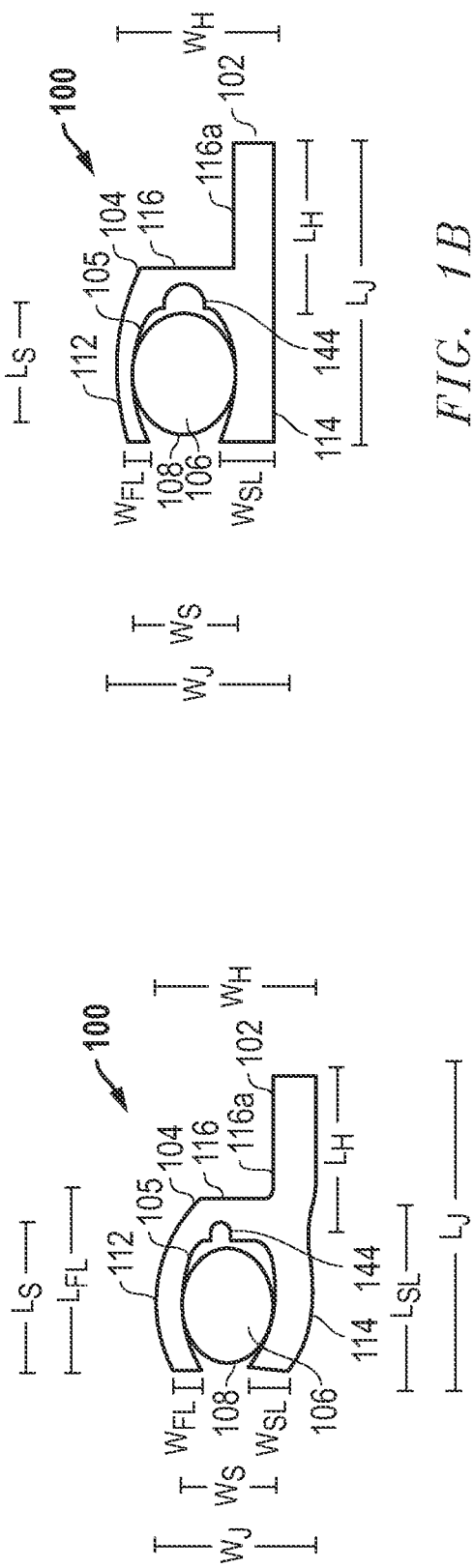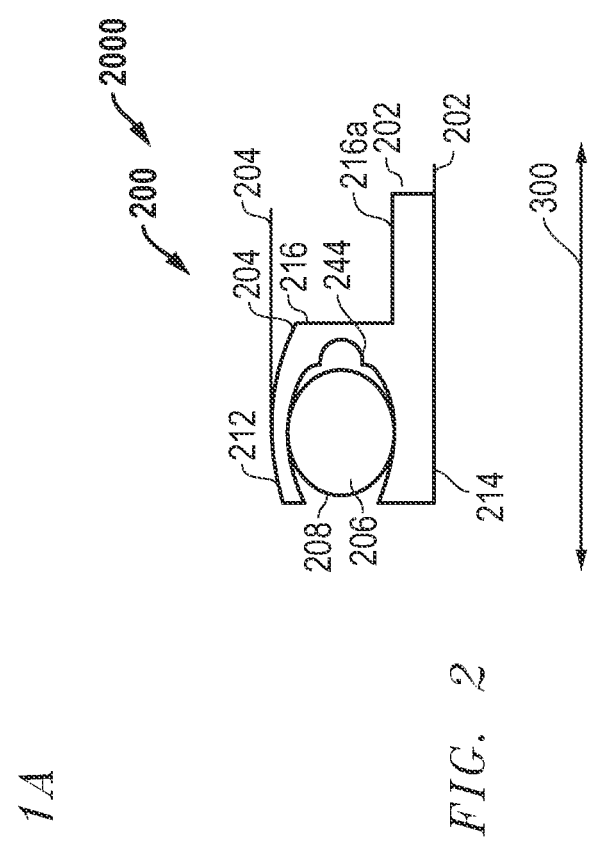

SEALS AND METHODS OF MAKING AND USING THE SAME

CROSS-REFERENCE TO RELATED APPLICATION(S)

This application claims priority under 35 U.S.C. § 119(e) to U.S. Provisional Application No. 63/261,815, entitled "SEALS AND METHODS OF MAKING AND USING THE SAME," by Xiang YAN et al., filed Sep. 29, 2021, which is assigned to the current assignee hereof and incorporated herein by reference in its entirety.

FIELD OF THE DISCLOSURE

The present disclosure relates to seals, and more particularly to annular seals, or seals adapted to be disposed to pressure conditions.

RELATED ART

Seals are employed in environments to segregate fluids (liquids, gases, slurries, etc.) from one another. Often, these seals may include energizers. Often, these seals must show minimal leakage under strict friction requirements in broad temperature ranges. The industry continues to demand improved seals capable of withstanding broader pressure and temperature conditions while maintaining operational effectiveness over time.

SUMMARY

Embodiments herein may include a seal including: annular jacket including a body including a heel, a first lip, and a second lip defining an annular recess, the first lip including an arcuate exterior portion, and having a thickness, $W_{FL}$, and a length $L_{FL}$; and an annular energizer disposed within the annular recess, adjacent to at least one of the first lip and the second lip, where the heel includes a cutout portion, and where the ratio of $L_{FL}:W_{FL}$ may be greater than 2.

Embodiments herein may include a seal assembly including: a first member; a second member; and a seal disposed between the first member and the second member, the seal including: an annular jacket including a body including a heel, a first lip including an arcuate exterior portion, and a second lip defining an annular recess; and an annular energizer disposed within the annular recess, adjacent to at least one of the first lip and the second lip, where the heel includes a cutout portion, and where the seal creates an outward biasing contact force on at least one of the first member or the second member, $F_S$, where $F_S$ has a temperature variability of less than 1000 N/(m circumference° C.).

Embodiments herein may include a seal assembly including: a first member; a second member; and a seal disposed between the first member and the second member, the seal including: an annular jacket including a body including a heel, a first lip including an arcuate exterior portion, and a second lip defining an annular recess; and an annular energizer disposed within the annular recess, adjacent to at least one of the first lip and the second lip, where the heel includes a cutout portion, where the exterior portion of the first lip of the seal has a contact area on at least one of the first member or the second member of at least 0.1% of the total area of the exterior portion of the first lip of the seal.

BRIEF DESCRIPTION OF THE DRAWINGS

Embodiments are illustrated by way of example and are not intended to be limited in the accompanying figures.

FIG. 1A includes a cross-sectional perspective view of a seal in accordance with an embodiment.

FIG. 1B includes a cross-sectional perspective view of a seal in accordance with an embodiment.

FIG. 2 includes a cross-sectional perspective view of a seal assembly in accordance with an embodiment.

Figure 3A:
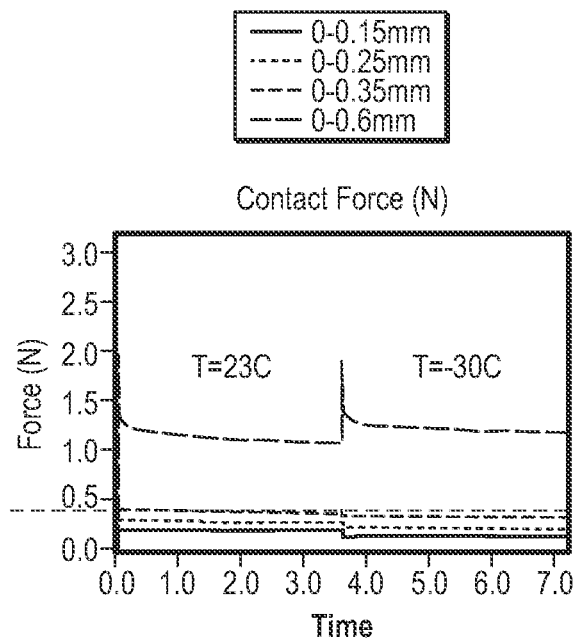
FIG. 3A includes a graph of the contact force over time of a seal in a seal assembly in accordance with an embodiment.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the sealing arts.

FIGS. 1A-1B illustrate a cross-sectional perspective view of a seal in accordance with a number of embodiments. Referring initially to FIG. 1A, a seal 100 in accordance with some embodiments described herein can generally include a jacket 102, and an energizer 108. The jacket 102 can include a body 104 having a heel 116, a first lip 112, and a second lip 114. In an embodiment, the body 104 may include an inner sidewall 105 that can define an annular recess 106. In a number of embodiments, the energizer 108 can be disposed within the annular recess 106.

Upon a loading condition, the energizer 108 may deform in an axial direction in the axial height of the seal 100 so as to contact or even push against a lip 112, 114 of the jacket 102. Resultantly, the lips 112, 114 may provide an outward force against a neighboring component (e.g. first and second member respectively) within an assembly. Meanwhile, the lips 112 and 114, compressed between the first and second member, may bias the energizer 108 in a direction transverse to the axial height of the seal 100, thus generating generally four biasing force directions, two inward axial forces and two opposing outward axial forces. The force provided by the energizer 108 on either lip 112, 114 may be different than the force provided by the first or second member. It is noted that the biasing forces described may be indirectly loaded against the energizer 108 in particular applications. Further, the energizer 108 may operative within wider temperature and pressure ranges than conventional energizers.

The seal 100 (including at least one of the jacket 102 or the energizer 108) can be formed from any suitable material in the sealing arts. In a particular embodiment, the seal 100 (including at least one of the jacket 102 or the energizer 108) can at least partially include a polymer. The polymer may be selected from the group including a polyketone, a polyaramid, a polyphenylene sulfide, a polyethersulfone, a polypheylene sulfone, a polyamideimide, ultra high molecular weight polyethylene, a fluoropolymer, a polybenzimidazole, a polyacetal, polybutylene terephthalate (PBT), polypropylene (PP), polycarbonate (PC), Acrylonitrile butadiene styrene (ABS), polyethylene terephthalate (PET), a polyimide (PI), polyetherimide, polyetheretherketone (PEEK), polyethylene (PE), a polysulfone, a polyamide (PA), polyphenylene oxide, polyphenylene sulfide (PPS), a polyurethane, a polyester, a liquid crystal polymer (LCP), an elastomer, or any combination thereof. The polymer may be a thermoplastic or thermosetting polymer. In an embodiment, the jacket 102 may include, or even consist essentially of, a fluoropolymer. Exemplary fluoropolymers include a polytetrafluoroethylene (PTFE), a polyether ether ketone (PEEK), a polyimide (PI), a polyamide-imide (PAI), a fluorinated ethylene propylene (FEP), a polyvinylidene fluoride (PVDF), a perfluoroalkoxy (PFA), a terpolymer of tetrafluoroethylene, a hexafluoropropylene and vinylidene fluoride (THV), a polychlorotrifluoroethylene (PCTFE), an ethylene tetrafluoroethylene copolymer (ETFE), an ethylene chlorotrifluoroethylene copolymer (ECTFE), or any combination thereof. Other fluoropolymers, polymers, and blends may be included in the composition of the jacket 102. In another particular embodiment, the seal 100 (including at least one of the jacket 102 or the energizer 108) can at least partially include, or even consist essentially of, a polyethylene (PE) such as an ultra-high-molecular-weight polyethylene (UHMWPE). In another particular embodiment, the seal 100 (including at least one of the jacket 102 or the energizer 108) may include a thermoplastic elastomeric hydrocarbon block copolymer, a polyether-ester block copolymer, a thermoplastic polyamide elastomer, a thermoplastic polyurethane elastomer, a thermoplastic polyolefin elastomer, a thermoplastic vulcanizate, an olefin-based copolymer, an olefin-based ter-polymer, a polyolefin plastomer, or combinations thereof. In an embodiment, the seal 100 (including at least one of the jacket 102 or the energizer 108) may include a styrene based block copolymer such as styrene-butadiene, styrene-isoprene, blends or mixtures thereof, mixtures thereof, and the like. Exemplary styrenic thermoplastic elastomers include triblock styrenic block copolymers (SBC) such as styrene-butadiene-styrene (SBS), styrene-isoprene-styrene (SIS), styrene-ethylene butylene-styrene (SEBS), styrene-ethylene propylene-styrene (SEPS), styrene-ethylene-ethylene-butadiene-styrene (SEEBS), styrene-ethylene-ethylene-propylene-styrene (SEEPS), styrene-isoprene-butadiene-styrene (SIBS), or combinations thereof. Commercial examples include some grades of Kraton™ and Hybrar™ resins. In an embodiment, the seal 100 (including at least one of the jacket 102 or the energizer 108) may include an elastomer including at least one of Acrylonitrile-Butadiene (NBR) Carboxylated Nitrile (XNBR) Ethylene Acrylate (AEM, Varnac®). Ethylene Propylene Rubber (EPR, EPDM). Butyl Rubber (IIR), Chloroprene Rubber (CR), Fluorocarbon (FKM, FPM), Fluorosilicone (FVMQ), Hydrogenated Nitrile (HNBR), Perfluoroelastomer (FFKM), Polyacrylate (ACM), Polyurethane (AU, EU), Silicone Rubber (Q, MQ, VMQ, PVMQ), Tetrafluoroethylene-Propylene (ATLAS®) (FEPM).

In an embodiment, the seal 100 (including at least one of the jacket 102 or the energizer 108) can be treated, impregnated, filled, or coated with a lubricious material. Exemplary lubricious materials include molybdenum disulfide, tungsten disulfide, graphite, grapheme, expanded graphite, boron nitrade, talc, calcium fluoride, or any combination thereof. Additionally, the lubricious material can include alumina, silica, titanium dioxide, calcium fluoride, boron nitride, mica, Wollastonite, silicon carbide, silicon nitride, zirconia, carbon black, pigments, or any combination thereof.

In an embodiment, the seal 100 (including at least one of the jacket 102 or the energizer 108) can at least partially include a metal. According to certain embodiments, the metal may include iron, copper, titanium, tin, aluminum, alloys thereof, or may be another type of metal. In an embodiment, the seal 100 (including at least one of the jacket 102 or the energizer 108) can include a metal (such as aluminum, zinc, copper, magnesium, tin, platinum, titanium, tungsten, iron, bronze, steel, energizer steel, stainless steel), a metal alloy (including the metals listed), an anodized metal (including the metals listed) or any combination thereof.

As stated above, the seal 100 may include a jacket 102. The jacket 102 may include a plurality of lips 112, 114 defining an annular recess 106. In a particular instance, the lips 112 and 114 can extend from the heel 116 of the body 104. In a particular embodiment, the lips 112 and 114 can extend from the heel 116 in a generally same direction relative to one another. In an embodiment, the first lip 112 may be located exterior to the second lip 114. In another particular embodiment, the lips 112 and 114 can extend parallel with respect to one another. In an optional embodiment, either or both of the lips 112 and 114 can include a skived lip (not illustrated) adapted to provide a scraper interface for sealing abrasive or viscous material, or environmental components such as dirt, debris, and environmental fluids. In a particular embodiment, the heel 116 can include a flange (not illustrated) which can be secured to a hardware (e.g., a valve housing or a shaft) to prevent the seal 100 from turning relative to the hardware within an assembly.

In an embodiment, the heel 116 of the jacket 102 can be generally rectilinear or planar. That is, the heel 116 may lie generally along a plane with minimal surface undulation and deviation. In a more particular embodiment, the heel 116 of the jacket 102 can be planar. As described in greater detail below, the planar, or generally planar, heel 116 of the jacket 102 may facilitate improved contact between adjacent seals thereby providing a better sealing characteristic. In an embodiment, the heel 116 may include an elongated heel portion 116a. In a number of embodiments the elongated heel portion 116a may have a rectilinear or polygonal cross-section. In a number of embodiments the elongated heel portion 116a may have an arcuate cross-section.

In an embodiment, at least one of the lips 112 and 114 can be generally planar profile extending from the heel 116. In an embodiment, at least one of the lips 112 and 114 can include a bulge extending outward from the respective lip 112 or 114 in a direction away from the annular recess 106, resulting in an arcuate shape. The bulge may extend around an entire circumference of the seal 100. Similar to the skived lip described above, the bulge may prevent ingress or egress of materials while exhibiting lower frictional drag. In another embodiment, one of the lips 112 or 114 can include a skived lip and the other lip 112 or 114 can include a bulge. In an embodiment, at least one of the lips 112 and 114 can include a rectilinear or planar shape.

As illustrated, the lips 112 and 114 of the jacket 102 can bow outward after installation of the energizer 108. After installation of the energizer 108, at least one of the lips 112 and 114 can be arcuate as viewed in cross section, biased outward by a biasing force provided by the energizer 108. After installation of the energizer 108, at least one of the lips 112 and 114 can be rectilinear or planar as viewed in cross section, biased outward by a biasing force provided by the energizer 108 or a neighboring component. As shown in FIGS. 1A-1B, the first lip 112 may include an arcuate profile along its inner portion (facing the recess 106) (e.g. arcuate interior portion) and an arcuate profile along its outer portion (facing the neighboring component) (e.g. arcuate exterior portion). Further, as shown in FIG. 1A, the second lip 114 may include an arcuate profile along its inner portion (facing the recess 106) (e.g. arcuate interior portion) and a planar, rectilinear, or flat profile along its outer portion (facing the neighboring component) (e.g. rectilinear exterior portion). In a number of embodiments, the entirety of the exterior portion of the first lip 112 or the second lip 114 may be arcuate. In a number of embodiments, the entirety of the interior portion of the first lip 112 or the second lip 114 may be arcuate.

In an embodiment, at least one of the first lip 112 or the second lip 114 may include a flange. In some embodiments, the flange may be arcuate as viewed in cross section. In some embodiments, the flange may be rectilinear or planar as viewed in cross section. The flange may include edges on the inside of the flange within the annular recess 106.

In an embodiment, the exterior portion of the first lip 112 may have a radius of curvature, $R_{FE}$. In a number of embodiments, the exterior portion of the first lip 112 may have a radius of curvature, $R_{FE}$ that may be positive. In a number of embodiments, the exterior portion of the first lip 112 may have a radius of curvature, $R_{FE}$ that may be greater than 0.1, such as greater than 0.5, such as greater than 1, such as greater than 2, such as greater than 5, such as greater than 10, such as greater than 20, such as greater than 25, such as greater than 50, such as greater than 100, or such as greater than 200. In a number of embodiments, the exterior portion of the first lip 112 may have a radius of curvature, $R_{FE}$ that may be negative. In a number of embodiments, the exterior portion of the first lip 112 may have a radius of curvature, $R_{FE}$ that may be less than −0.1, such as less than −0.5, such as less than −1, such as less than −2, such as less than −5, such as less than −10, such as less than −20, such as less than −25, such as less than −50, such as less than −100, or such as less than −200. It will be further appreciated that the exterior portion of the first lip 112 may have a radius of curvature, $R_{FE}$ that may be any value between any of the minimum and maximum values noted above. It can also be appreciated that the exterior portion of the first lip 112 may have a radius of curvature, $R_{FE}$ that may vary along its circumference and length.

In an embodiment, the interior portion of the first lip 112 may have a radius of curvature, $R_{FI}$. In a number of embodiments, the interior portion of the first lip 112 may have a radius of curvature, $R_{FI}$ that may be positive. In a number of embodiments, the interior portion of the first lip 112 may have a radius of curvature, $R_{FI}$ that may be greater than 0.1, such as greater than 0.5, such as greater than 1, such as greater than 2, such as greater than 5, such as greater than 10, such as greater than 20, such as greater than 25, such as greater than 50, such as greater than 100, or such as greater than 200. In a number of embodiments, the interior portion of the first lip 112 may have a radius of curvature, $R_{FI}$ that may be negative. In a number of embodiments, the interior portion of the first lip 112 may have a radius of curvature, $R_{FI}$ that may be less than −0.1, such as less than −0.5, such as less than −1, such as less than −2, such as less than −5, such as less than −10, such as less than −20, such as less than −25, such as less than −50, such as less than −100, or such as less than −200. It will be further appreciated that the interior portion of the first lip 112 may have a radius of curvature, $R_{FI}$ that may be any value between any of the minimum and maximum values noted above. It can also be appreciated that the interior portion of the first lip 112 may have a radius of curvature, $R_{FI}$ that may vary along its circumference and length.

In an embodiment, the seal 100 may have a ratio of radius of curvature, $R_{FE}$ of the exterior portion of the first lip 112 to the radius of curvature, $R_{FI}$ of the interior portion of the first lip 112, ($R_{FE}:R_{FI}$) of at least 1:1, such as 2:1, such as 3:1, such as 4:1, such as 5:1, such as 10:1, such as 12:1, such as 15:1, such as 25:1 or such as 50:1. It will be further appreciated that the ratio of radius of curvature, $R_{FL}$ of the exterior portion of the first lip 112 to the radius of curvature, $R_{FI}$ of the interior portion of the first lip 11, ($R_{FE}:R_{FI}$) may be any value between any of the minimum and maximum values noted above. It can also be appreciated that the ratio of radius of curvature, $R_{FL}$ of the exterior portion of the first lip 112 to the radius of curvature, $R_{FI}$ of the interior portion of the first lip 112, ($R_{FE}:R_{FI}$) that may vary along its circumference and length.

In an embodiment, the jacket 102 may have a length $L_J$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The jacket 102 may have a length $L_J$ that may be no greater than 1500 mm, no greater than 1000 mm, or no greater than 500 mm. It will be further appreciated that the jacket 102 may have a length $L_J$ that may be any value between any of the minimum and maximum values noted above. In a number of embodiments, the jacket 102 may have a length $L_J$ that may be between 0.5 mm and 50 mm. It can also be appreciated that the jacket 102 may have a length $L_J$ that may vary along its circumference. In a number of embodiments, the jacket 102 may have a length $L_J$ that may be the same as the overall length of the seal 100 itself.

In an embodiment, the jacket 102 may have a width $W_J$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The jacket 102 may have a width $W_J$ that may be no greater than 1500 mm, no greater than 1000 mm, or no greater than 500 mm. It will be further appreciated that the jacket 102 may have a width $W_J$ that may be any value between any of the minimum and maximum values noted above. In a number of embodiments, the jacket 102 may have a width $W_J$ that may be between 0.5 mm and 20 mm. It can also be appreciated that the jacket 102 may have a width $W_J$ that may vary along its circumference. In a number of embodiments, the jacket 102 may have a width $W_J$ that may be the same as the overall length of the seal 100 itself.

In an embodiment, the first lip 112 may have a length $L_{FL}$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The first lip 112 may have a length $L_{FL}$ that may be no greater than 1500 mm, no greater than 1000 mm, or no greater than 500 mm. It will be further appreciated that the first lip 112 may have a length $L_{FL}$ that may be any value between any of the minimum and maximum values noted above. In a number of embodiments, the first lip 112 may have a length $L_{FL}$ that may be between 0.3 mm and 10 mm. It can also be appreciated that the first lip 112 may have a length $L_{FL}$ that may vary along its circumference.

In an embodiment, the first lip 112 may have a thickness $W_{FL}$ of at least 0.01 mm, at least 0.05 mm, at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The first lip 112 may have a thickness $W_{FL}$ that may be no greater than 1500 mm, no greater than 1000 mm, or no greater than 500 mm. It will be further appreciated that first lip 112 may have a thickness $W_{FL}$ that may be any value between any of the minimum and maximum values noted above. In a number of embodiments, the first lip 112 may have a width $W_{FL}$ that may be between 0.1 mm and 2 mm. It can also be appreciated that the first lip 112 may have a thickness $W_{FL}$ that may vary along its circumference.

In an embodiment, the first lip 112 may have a ratio of length $L_{FL}$ to thickness $W_{FL}$ of at least 2:1, such as 3:1, such as 4:1, such as 5:1, such as 10:1, such as 12:1, such as 15:1, such as 25:1 or such as 50:1. It will be further appreciated that first lip 112 may have a ratio of length $L_{FL}$ to thickness $W_{FL}$ may be any value between any of the minimum and maximum values noted above. It can also be appreciated that the first lip 112 may have a ratio of length $L_{FL}$ to thickness $W_{FL}$ that may vary along its circumference.

In an embodiment, the second lip 114 may have a length $L_{SL}$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The second lip 114 may have a length $L_{SL}$ that may be no greater than 1500 mm, no greater than 1000 mm, or no greater than 500 mm. It will be further appreciated that the second lip 114 may have a length $L_{SL}$ that may be any value between any of the minimum and maximum values noted above. In a number of embodiments, the second lip 114 may have a length $L_{SL}$ that may be between 0.3 mm and 10 mm. It can also be appreciated that the second lip 114 may have a length $L_{SL}$ that may vary along its circumference.

In an embodiment, the second lip 114 may have a thickness $W_{SL}$ of at least 0.01 mm, at least 0.05 mm, at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The second lip 114 may have a thickness $W_{SL}$ that may be no greater than 1500 mm, no greater than 1000 mm, or no greater than 500 mm. It will be further appreciated that second lip 114 may have a thickness $W_{SL}$ that may be any value between any of the minimum and maximum values noted above. In a number of embodiments, the second lip 114 may have a width $W_{SL}$ that may be between 0.1 mm and 2 mm. It can also be appreciated that the second lip 114 may have a thickness $W_{SL}$ that may vary along its circumference.

In an embodiment, the second lip 114 may have a ratio of length $L_{SL}$ to thickness $W_{SL}$ of at least 2:1, such as 3:1, such as 4:1, such as 5:1, such as 10:1, such as 12:1, such as 15:1, such as 25:1 or such as 50:1. It will be further appreciated that second lip 114 may have a ratio of length $L_{SL}$ to thickness $W_{SL}$ may be any value between any of the minimum and maximum values noted above. It can also be appreciated that the second lip 114 may have a ratio of length $L_{SL}$ to thickness $W_{SL}$ that may vary along its circumference. In a number of embodiments, as shown in FIGS. 1A-1B, the thicknesses of the two lips 112, 114 may differ.

In an embodiment, the heel 116 may have a length $L_H$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The heel 116 may have a length $L_H$ that may be no greater than 1500 mm, no greater than 1000 mm, or no greater than 500 mm. It will be further appreciated that the heel 116 may have a length $L_H$ that may be any value between any of the minimum and maximum values noted above. In a number of embodiments, the heel 116 may have a length $L_H$ that may be between 0.2 mm and 40 mm. It can also be appreciated that the heel 116 may have a length $L_H$ that may vary along its circumference.

In an embodiment, the heel 116 may have a thickness $W_H$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The heel 116 may have a thickness $W_H$ that may be no greater than 1500 mm, no greater than 1000 mm, or no greater than 500 mm. It will be further appreciated that heel 116 may have a thickness $W_H$ that may be any value between any of the minimum and maximum values noted above. In a number of embodiments, the heel 116 may have a width $W_H$ that may be between 0.5 mm and 20 mm. It can also be appreciated that the heel 116 may have a thickness $W_H$ that may vary along its circumference.

In an embodiment, the heel 116 may have a ratio of length $L_H$ to thickness $W_H$ of at least 1:1, such as 1:2, such as 1:5, such as 1:10, such as 1:15, such as 1:25, such as 1:50. In an embodiment, the heel 116 may have a ratio of length $L_H$ to thickness $W_H$ of at least 2:1, such as 3:1, such as 4:1, such as 5:1, such as 10:1, such as 12:1, such as 15:1, such as 25:1 or such as 50:1. It will be further appreciated that heel 116 may have a ratio of length $L_H$ to thickness $W_H$ may be any value between any of the minimum and maximum values noted above. It can also be appreciated that the heel 116 may have a ratio of length $L_H$ to thickness $W_H$ that may vary along its circumference.

As stated above, in an embodiment, the jacket 102 may include an inner sidewall 105 that can define the annular recess 106. The inner sidewall 105 can include a cutout 144 adapted to permit greater flexure of the lips 112, 114 relative to one another. As the seal 100 is installed within an assembly as described in further detail below, the inner sidewall 104 can deflect inward to rest against a neighboring component. Deflection can occur, among other areas, in the cutout 144 of the annular body 102, providing greater flexibility of the seal. In a number of embodiments, the cutout 144 may have a rectilinear or polygonal cross-section. In a number of embodiments, the cutout 144 may have an arcuate cross-section. In an embodiment, the cutout 144 may have an area, $A_C$, and the annular recess may have an area $A_R$, wherein $A_C$ may be greater than 0.01 $A_{AR}$, such as greater than 0.1 $A_{AR}$, such as greater than 0.2 $A_{AR}$, such as greater than 0.3 $A_{AR}$, such as greater than 0.4 $A_{AR}$, or such as greater than 0.5 $A_{AR}$.

As shown in FIGS. 1A-1B, the energizer 108 can be disposed at least partially within the annular recess 106 of the jacket 102. The energizer 108 may be an axially oriented energizer in the annular recess 106 of the jacket 102. In an embodiment, the energizer 108 may be disposed along, adjacent, or directly adjacent to the first lip 112. In an embodiment, the energizer 108 may be disposed along, adjacent, or directly adjacent to the second lip 114.

In an embodiment, as shown in FIG. 1A, the energizer 108 may be a coil spring oriented circumferentially within the recess 106 of the jacket 102. The coil spring energizer 108 may have a rectilinear, polygonal, oval, or arcuate cross-sectional profile. In an embodiment, the energizer 108 may have a diameter less than 150% the depth of the annular recess 106, such as less than 100% of the depth of the annular recess 106, or even less than 75% of the depth of the annular recess 106. In an embodiment, the diameter of the energizer 108 can be no less than 10% of the depth of the annular recess 106.

In an embodiment, the energizer 108 may have a length $L_S$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizer 108 may have a length $L_S$ that may be no greater than 1500 mm, no greater than 1000 mm, or no greater than 500 mm. It will be further appreciated that the energizer 108 may have a length $L_S$ that may be any value between any of the minimum and maximum values noted above. In a number of embodiments, the energizer 108 may have a length $L_S$ that may be between 0.3 mm and 8 mm. It can also be appreciated that the energizer 108 may have a length $L_S$ that may vary along its circumference.

In an embodiment, the energizer 108 may have a thickness $W_S$ of at least 0.1 mm, at least 1 mm, at least 5 mm, at least 10 mm, at least 25 mm, at least 50 mm, at least 75 mm, at least 100 mm, at least 150 mm, at least 250 mm, at least 500 mm. The energizer 108 may have a thickness $W_S$ that may be no greater than 1500 mm, no greater than 1000 mm, or no greater than 500 mm. It will be further appreciated that energizer 108 may have a thickness $W_S$ that may be any value between any of the minimum and maximum values noted above. In a number of embodiments, the energizer 108 may have a thickness $W_S$ that may be between 0.3 mm and 8 mm. It can also be appreciated that energizer 108 may have a thickness $W_S$ that may vary along its circumference.

The energizer 108 may be arcuate as viewed in cross section. In some embodiments, the energizer 108 may be rectilinear or planar as viewed in cross section. As shown in FIG. 1A, the energizer 108 may contact at least one of the lips 112, 114 of the jacket 102. In an embodiment, the energizer 108 may contact substantially the entirety of at least one of the lips 112, 114 in the axial direction. As shown in FIG. 1B, in an embodiment, the energizer 108 may embed within at least one of the annular flanges the lips 112, 114 of the jacket 102. In an embodiment, the energizer 108 may contact at least one of the lips 112, 114 of the jacket 102. In an embodiment, the energizer 108 may contact substantially the entirety of at least one of the lips 112, 114 of the jacket 102.

As contemplated in at least one embodiment described herein, the energizer 108 can include a length of material formed into a helical energizer having a plurality of coils. In an embodiment, the energizer 108 can include at least 2 coils, such as at least 3 coils, at least 4 coils, at least 5 coils, at least 10 coils, at least 100 coils, at least 200 coils, at least 300 coils, at least 400 coils, at least 500 coils, or even at least 1000 coils. The length of material forming the energizer 108 can have a polygonal or ellipsoidal cross section. For example, in an embodiment, the energizer 108 can be formed from circular wire. In another embodiment, the energizer 108 can be formed from a ribbon of material wound into a plurality of coils. The coils of the energizer 108 can be adjacent or even partially overlap one another. In a particular instance the coils can be parallel to one another. In another instance, the coils can cant relative to each other. That is, the coils can be angularly offset and angled with respect to one another.

In the relaxed state, the energizer 108 may have a generally round cross section. That is, the energizer 108 may be a helical energizer, as described above. In other embodiments, the energizer 108 may define a generally polygonal cross-sectional profile. In a more particular embodiment, the energizer 108 may have a generally T-shaped cross-sectional profile. In another embodiment, the energizer 108 may have an ellipsoidal cross section. For example, in a non-illustrated embodiment, the energizer 108 may have an ovular or circular cross-sectional profile. In yet a further embodiment, the cross section of the energizer 108 may be partially ellipsoidal and partially polygonal. That is, the cross section of the energizer 108 may have linear portions and arcuate portions. The wire forming the coil of the energizer 108 may be rectangular, square, circular, elliptical, or keystone in cross section.

In an embodiment, the energizer 108 may extend around the entire circumference of the seal 100. In a more particular embodiment, the energizer 108 may have a uniform shape and material characteristic around the entire circumference of the seal 100. In another more particular embodiment, the energizer 108 may have a varying shape or material selection around the circumference of the seal 100. In another embodiment, the energizer 108 may extend around only a portion of the circumference of the seal 100. In a more particular embodiment, the energizer 108 may comprise a plurality of energizers 108 at least partially spaced apart from one another. In such embodiment, there may be a circumferential space between adjacent energizers 108.

The energizer 108 can at least partially include, or even consist essentially of, a metal, such as a steel, or even more particularly energizer steel. The metal can be coated or surface treated to prevent corrosion or another undesirable effect from environmental exposure. In another embodiment, the energizer 108 can at least partially include, or even consist essentially of, for example, Eligloy, Inconel, Hastelloy, or a combination thereof.

In yet a further embodiment, the energizer 108 can include cobalt, chromium, nickel, iron, molybdenum, manganese, beryllium copper, or a combination thereof. In a particular embodiment, the energizer 108 can include at least 10 wt % of cobalt, such as at least 20 wt % of cobalt, at least 25 wt % of cobalt, at least 30 wt % of cobalt, at least 35 wt % of cobalt, or even at least 40 wt % of cobalt. The energizer 108 can have a yield strength of less than 1200 MPa, such as less than 1100 MPa, less than 1000 MPa, or even less than 900 MPa. In a particular instance, the energizer 108 may be heat treated or surface treated to enhance properties thereof.

The energizer 108 may provide a biasing force against the jacket 102. Specifically, the energizer 108 may contact at least one of the first lip 112 or the second lip 114 and provide an outwardly biasing force, $F_E$, thereagainst. In a particular embodiment, the biasing force, $F_E$, of the energizer 108 against a lip 112, 114 can be at least 0.001 N/mm, such as at least 0.01 N/mm. In another embodiment, the biasing force, $F_E$, can be less than 5000 N/mm, less than 1000 N/mm, less than 500 N/mm, less than 400 N/mm, less than 300 N/mm, less than 200 N/mm, less than 100 N/mm, less than 50 N/mm, less than 25 N/mm, or even less than 10 N/mm. In a number of embodiments, the energizer 108 may provide a biasing force, $F_E$, against the first lip 112 or the second lip 114 of between 0.1 N/mm and 30 N/mm. In a number of embodiments, the biasing force, $F_E$, against the first lip 112 may be different than the biasing force, $F_E$, against the second lip 114.

FIG. 2 includes a cross-sectional perspective view of a seal within a seal assembly in accordance with an embodiment. Although FIG. 2 illustrates the seal 200 in an axial orientation, the seal 200 could be oriented in any potential orientation including radial or face sealing orientations. The seal 200 may have the same components listed above regarding FIGS. 1A-1B. As shown in FIG. 2, the seal 200 may be placed between a first member 202 and a second member 204 within a seal assembly 2000 down a central axis 300. The first member 202 may be a shaft. The second member 204 may be a housing. At least one of the first member 202 or second member 204 may actuate relative to at least one of the seal 200 or the other of the first member 202 or second member 204. The actuation may be a rotational, radial, or axial movement. The components of the seal 200 of FIG. 2 may be the same as those described above in FIGS. 1A-1B. In an embodiment, at least one of the first or second lip 212, 214 may be static while the other of the first or second lip 212, 214 may be dynamic within the seal assembly. Further, the first member 202 may be made of a material having a different expansion coefficient than the second member 204 or vice versa.

The seal 200 may provide a biasing contact force, $F_S$, against at least one of first member 202 or the second member 204. Specifically, the seal 200 may provide a biasing force, $F_S$, against at least one of first member 202 or the second member 204, thereagainst. In a particular embodiment, the seal 200 may provide a biasing force, $F_S$, against at least one of first member 202 or the second member 204 can be at least 0.001 N/mm, such as at least 0.01 N/mm. In another embodiment, the biasing force, $F_S$, can be less than 5000 N/mm, such as less than 1000 N/mm, such as less than 500 N/mm, less than 400 N/mm, less than 300 N/mm, less than 200 N/mm, less than 100 N/mm, less than 50 N/mm, less than 25 N/mm, or even less than 10 N/mm. In a number of embodiments, the seal 200 may provide a biasing contact force, $F_S$, against at least one of first member 202 or the second member 204 of between 0.2 N/mm and 150 N/mm. In a number of embodiments, the biasing force, $F_S$, against the first member 202 may be different than the biasing force, $F_{Ss}$, against the second member 204.

In an embodiment, the biasing contact force, $F_S$, against at least one of first member 202 or the second member 204 may have a variability of less than 1000 N/(m circumference° C.). In other words, the value of the biasing contact force, $F_S$, against at least one of first member 202 or the second member 204 may not vary by more than 1000 N/m as you increase or decrease the temperature by a single ° C. along any temperature range. In an embodiment, the biasing contact force, $F_S$, against at least one of first member 202 or the second member 204 may have a variability of less than 1,000 N/(m circumference° C.), 500 N/(m circumference° C.), 100 N/(m circumference° C.), 50 N/(m circumference° C.), 25 N/(m circumference° C.), 10 N/(m circumference° C.), 1 N/(m circumference° C.), or even 0.1 N/(m circumference° C.). In a number of embodiments, the biasing contact force, $F_S$, against at least one of first member 202 or the second member 204 may have a variability of about 1,000 N/(m circumference° C.)

In an embodiment, the ratio of the biasing force, $F_E$, of the energizer against at least one of the first lip to the biasing force, $F_S$, of the seal against at least one of the first member or second member may be not greater than 1:1, such as 1:2, such as 1:3, such as 1:4, such as 1:5, such as 1:10, such as 1:12, such as 1:15, such as 1:25 or such as 1:50. It will be further appreciated that ratio of $F_E:F_S$ may be any value between any of the minimum and maximum values noted above. It can also be appreciated that ratio of $F_E:F_S$ that may vary along its circumference.

Figure 3B:
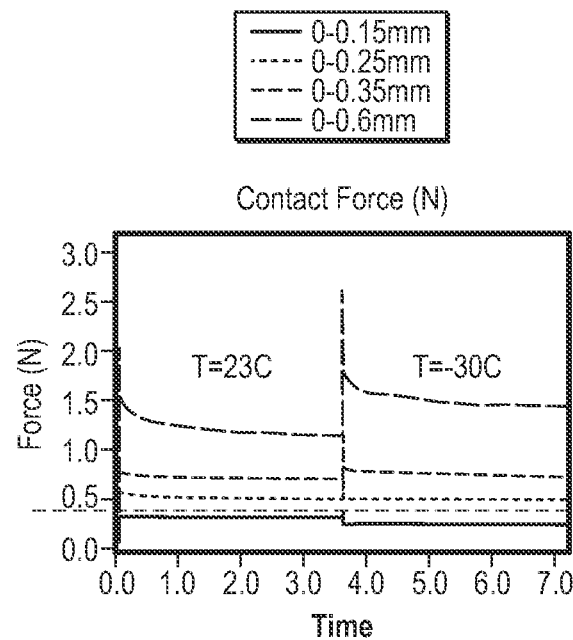
FIG. 3B includes a graph of the contact force over time of a conventional seal in a seal assembly.

FIGS. 3A-3B include respective graphs of the contact force, $F_S$, over time of a conventional seal verses a seal in accordance with an embodiment, within a seal assembly. As shown, the seal in accordance with embodiments herein exhibits improved or reduced contact force at room temperature and lower temperatures compared to conventional seals.

The seal 200 may have a contact area on at least one of first member 202 or the second member 204. In a particular embodiment, the seal 200 may have a contact area on at least one of first member 202 or the second member 204 of at least 0.1% of the total area of the seal 200. In another embodiment, the contact area on at least one of first member 202 or the second member 204 of at least 0.1% of the total area of the seal 200, such as at least 0.5%, such as at least 1%, such as at least 2.5%, such as at least 5%, such as at least 10%, such as at least 15%, such as at least 20%, such as at least 25%, such as at least 30%, such as at least 35%, such as at least 40%, such as at least 45%, such as at least 50%, such as at least 55%, such as at least 60%, such as at least 65%, such as at least 70%, such as at least 75%, or such as at least 80% of the total area of the seal 200.

Figure 4A:
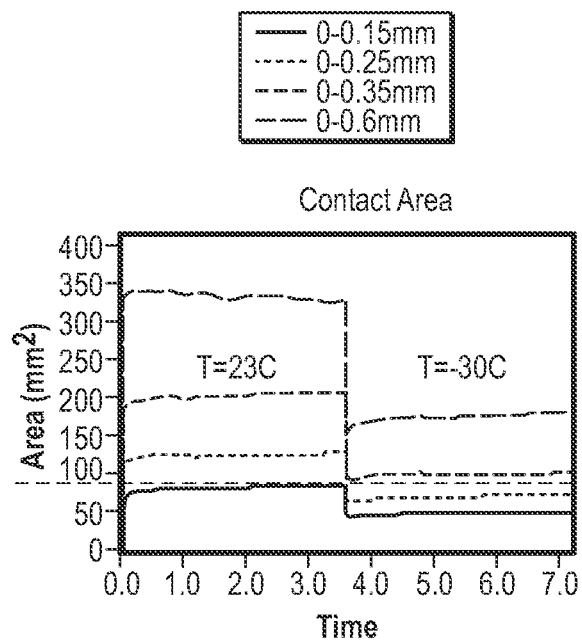
FIG. 4A includes a graph of the contact area over time of a seal in a seal assembly in accordance with an embodiment.
Figure 4B:
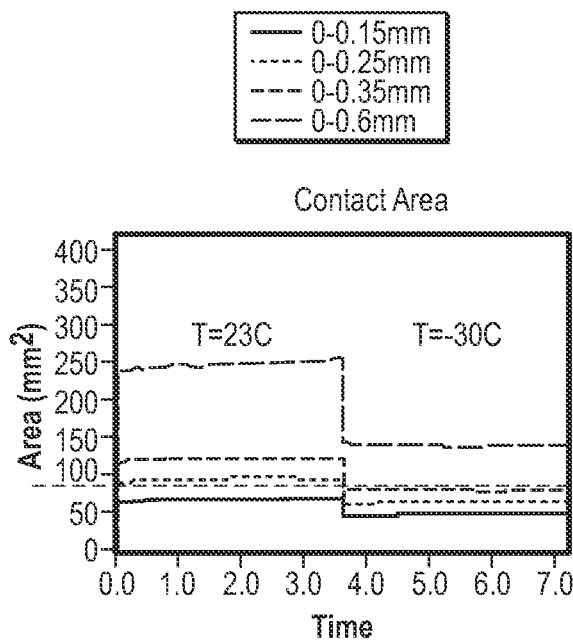
FIG. 4B includes a graph of the contact area over time of a conventional seal in a seal assembly.

FIGS. 4A-4B include respective graphs of the contact area over time of a conventional seal verses a seal in accordance with an embodiment, within a seal assembly. As shown, the seal in accordance with embodiments herein exhibits improved contact area at room temperature and lower temperatures compared to conventional seals.

The seal 100 may form an assembly which can be utilized in a bidirectional pressure application. The seal 100 may be oriented and protect against leakage of fluid in a forward axial direction, or the seal 100 may be oriented and protect against leakage of fluid in a backward axial direction down the central axis 300. The seal 100 may be oriented and protect against leakage of fluid in an inward direction, or the seal 100 may be oriented and protect against leakage of fluid in an outward direction in a direction perpendicular to the central axis 300. In this regard, the seal 100 may be selected to have specific characteristics which permit effective sealing in those particular orientations. Particular suitable applications include cryogenic valves, pistons, subsea bidirectional couplings, and other movable components requiring sealing therebetween.

Seals described according to embodiments herein may allow for the components of the seal to have a longer lifetime due to appropriately placed forces that lessen repeat compression and stressing of the individual components (e.g. the energizer, jacket) due to vibration or actuation of the seal or other components within the assembly. As a result, the lifetime of the components and the seal itself may be improved and overall leakage may be lessened.

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1: A seal comprising: an annular jacket comprising a body comprising a heel, a first lip, and a second lip defining an annular recess, the first lip comprising an arcuate exterior portion, and having a thickness, $W_{FL}$, and a length $L_{FL}$; and an annular energizer disposed within the annular recess, adjacent to at least one of the first lip and the second lip, wherein the heel comprises a cutout portion, and wherein the ratio of $L_{FL}:W_{FL}$ is greater than 2.

Embodiment 2: A seal assembly comprising: a first member; a second member; and a seal disposed between the first member and the second member, the seal comprising: an annular jacket comprising a body comprising a heel, a first lip comprising an arcuate exterior portion, and a second lip defining an annular recess; and an annular energizer disposed within the annular recess, adjacent to at least one of the first lip and the second lip, wherein the heel comprises a cutout portion, and wherein the seal creates an outward biasing contact force on at least one of the first member or the second member, $F_S$, wherein $F_S$ has a variability of less than 1000 N/(m circumference° C.).

Embodiment 3: A seal assembly comprising: a first member; a second member; and a seal disposed between the first member and the second member, the seal comprising: an annular jacket comprising a body comprising a heel, a first lip comprising an arcuate exterior portion, and a second lip defining an annular recess; and an annular energizer disposed within the annular recess, adjacent to at least one of the first lip and the second lip, wherein the heel comprises a cutout portion, wherein the exterior portion of the first lip of the seal has a contact area on at least one of the first member or the second member of at least 0.1% of the total area of the exterior portion of the first lip of the seal.

Embodiment 4: The seal or seal assembly according to any one of the preceding embodiments, wherein at least one of the first lip or the second lip comprises a planar exterior portion.

Embodiment 5: The seal or seal assembly according to any one of the preceding embodiments, wherein at least one of the first lip or the second lip comprises an arcuate exterior portion.

Embodiment 6: The seal or seal assembly according to any one of the preceding embodiments, wherein the energizer provides a biasing force against the first lip or the second lip of between 0.1 and 30 N/mm.

Embodiment 7: The seal or seal assembly according to any one of the preceding embodiments, wherein the seal provides a biasing force against the first member or the second member of between 0.2 and 150 N/mm.

Embodiment 8: The seal or seal assembly according to any one of the preceding embodiments, wherein the jacket comprises an elongated heel portion.

Embodiment 9: The seal or seal assembly according to any one of the preceding embodiments, wherein at least one of the first or second lip is static within the seal assembly.

Embodiment 10: The seal or seal assembly according to any one of the preceding embodiments, wherein at least one of the first or second lip is dynamic within the seal assembly.

Embodiment 11: The seal or seal assembly according to any one of the preceding embodiments, wherein the energizer is a coil spring.

Embodiment 12: The seal or seal assembly according to any one of the preceding embodiments, wherein the first lip is located exterior to the second lip.

Embodiment 13: The seal or seal assembly according to any one of the preceding embodiments, wherein the energizer comprises a metal.

Embodiment 14: The seal or seal assembly according to any one of the preceding embodiments, wherein the energizer comprises a polymer.

Embodiment 15: The seal or seal assembly according to any one of the preceding embodiments, wherein the jacket comprises a metal.

Embodiment 16: The seal or seal assembly according to any one of the preceding embodiments, wherein the jacket comprises a polymer.

Embodiment 17: The seal or seal assembly according to any one of the preceding embodiments, wherein the cutout has an arcuate cross-section.

Embodiment 18: The seal or seal assembly according to any one of the preceding embodiments, wherein the cutout has a rectilinear cross-section.

Embodiment 19: The seal or seal assembly according to any one of the preceding embodiments, wherein the cutout has an area, $A_C$, and the annular recess has an area $A_{AR}$, wherein $A_C$ is greater than 0.01 $A_{AR}$.

Embodiment 20: The seal assembly according to embodiment 11, wherein the energizer has a rectangular, square, or keystone cross-sectional wire.

Embodiment 21: The seal assembly according to embodiment 11, wherein the energizer has a circular cross-sectional wire.

Embodiment 22: The seal or seal assembly according to any one of the preceding embodiments, wherein the seal has a length of between 0.5 and 50 mm.

Embodiment 23: The seal or seal assembly according to any one of the preceding embodiments, wherein the seal has a width of between 0.5 and 20 mm.

Embodiment 24: The seal or seal assembly according to any one of the preceding embodiments, wherein the first lip has an exterior radius of curvature, $R_{FE}$, and an interior radius of curvature, $R_{FI}$, wherein $R_{FE}/R_{FI}$ is greater than 1.

Embodiment 25: The seal or seal assembly according to any one of the preceding embodiments, wherein the first lip has an exterior portion that is entirely arcuate.

Note that not all of the features described above are required, that a portion of a specific feature may not be required, and that one or more features may be provided in addition to those described. Still further, the order in which features are described is not necessarily the order in which the features are installed.

Certain features are, for clarity, described herein in the context of separate embodiments, may also be provided in combination in a single embodiment. Conversely, various features that are, for brevity, described in the context of a single embodiment, may also be provided separately or in any subcombinations.

Benefits, other advantages, and solutions to problems have been described above with regard to specific embodiments, However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or any change may be made without departing from the scope of the disclosure. Accordingly, the disclosure is to be regarded as illustrative rather than restrictive.

What is claimed is:

1. A seal comprising:
an annular jacket comprising a body comprising a heel, a first lip, and a second lip defining an annular recess, the first lip comprising an arcuate exterior portion, and having a thickness, $W_{FL}$, and a length $L_{FL}$; and
an annular energizer disposed within the annular recess, adjacent to at least one of the first lip and the second lip, wherein the heel comprises a cutout portion, and wherein the ratio of $L_{FL}:W_{FL}$ is greater than 2, wherein the seal is asymmetrical about a line including an axial center of the cutout.

2. The seal of claim 1, wherein at least one of the first lip or the second lip comprises a planar exterior portion.

3. The seal of claim 1, wherein at least one of the first lip or the second lip comprises an arcuate exterior portion.

4. The seal of claim 1, wherein the energizer provides a biasing force against the first lip or the second lip of between 0.1 and 30 N/mm.

5. The seal of claim 1, wherein the jacket comprises an elongated heel portion.

6. The seal of claim 1, wherein the energizer is a coil spring.

7. The seal of claim 1, wherein the first lip is located exterior to the second lip.

8. The seal of claim 1, wherein the energizer comprises a metal.

9. The seal of claim 1, wherein the jacket comprises a metal.

10. The seal of claim 1, wherein the jacket comprises a polymer.

11. The seal of claim 1, wherein the cutout has an arcuate cross-section.

12. The seal of claim 1, wherein the cutout has a rectilinear cross-section.

13. The seal of claim 1, wherein the cutout has an area, $A_C$, and the annular recess has an area $A_{AR}$, wherein $A_C$ is greater than $0.01\ A_{AR}$.

14. The seal of claim 1, wherein the first lip has an exterior radius of curvature, $R_{FE}$, and an interior radius of curvature, $R_{FI}$, wherein $R_{FE}:R_{FI}$ is greater than 1.

15. The seal of claim 1, wherein the first lip has an exterior portion that is entirely arcuate.

16. A seal assembly comprising:
a first member;
a second member; and
a seal disposed between the first member and the second member, the seal comprising:
an annular jacket comprising a body comprising a heel, a first lip comprising an arcuate exterior portion, and a second lip defining an annular recess; and
an annular energizer disposed within the annular recess, adjacent to at least one of the first lip and the second lip, wherein the heel comprises a cutout portion, and wherein the seal creates an outward biasing contact force on at least one of the first member or the second member, $F_S$, wherein $F_S$ has a variability of less than 1000 N/(m circumference ° C.), wherein the seal is asymmetrical about a line including an axial center of the cutout.

17. The seal assembly of claim 16, wherein the seal provides a biasing force against the first member or the second member of between 0.2 and 150 N/mm.

18. The seal assembly of claim 16, wherein at least one of the first or second lip is static within the seal assembly.

19. The seal assembly of claim 16, wherein at least one of the first or second lip is dynamic within the seal assembly.

20. A seal assembly comprising:
a first member;
a second member; and
a seal disposed between the first member and the second member, the seal comprising:
an annular jacket comprising a body comprising a heel, a first lip comprising an arcuate exterior portion, and a second lip defining an annular recess; and
an annular energizer disposed within the annular recess, adjacent to at least one of the first lip and the second lip, wherein the heel comprises a cutout portion, wherein the exterior portion of the first lip of the seal has a contact area on at least one of the first member or the second member of at least 0.1% of the total area of the exterior portion of the first lip of the seal, wherein the seal is asymmetrical about a line including an axial center of the cutout.

* * * * *